United States Patent [19]

Wierzbicki

[11] 3,971,412

[45] July 27, 1976

[54] QUICK ACTING VALVES

[75] Inventor: Alexander Wierzbicki, Southport, England

[73] Assignee: Dewrance & Company, Limited, Skelmersdale, England

[22] Filed: Mar. 18, 1974

[21] Appl. No.: 451,902

[30] Foreign Application Priority Data

Mar. 19, 1973 United Kingdom............... 13156/73

[52] U.S. Cl................................. 137/625.5; 251/31; 251/33; 251/35
[51] Int. Cl.² ..................... F16K 31/38; F16K 11/04
[58] Field of Search ................... 251/35, 31, 33, 50; 137/625.5

[56] References Cited

UNITED STATES PATENTS

| 1,046,236 | 12/1912 | Wagner................................ 251/35 |
| 1,177,463 | 3/1916 | Wagner................................ 251/35 |
| 1,435,067 | 11/1922 | Hurst................................... 251/35 |
| 1,647,189 | 11/1927 | Mueller et al. .................... 251/35 X |
| 2,000,297 | 5/1935 | Putnam.............................. 251/35 |
| 2,205,033 | 6/1940 | Dreyer et al......................... 251/35 |
| 2,487,418 | 11/1949 | Birkemeier et al. ............... 251/35 X |
| 2,699,316 | 1/1955 | Mosher............................... 251/35 |
| 2,917,268 | 12/1959 | Soderberg et al................... 251/35 |
| 3,415,269 | 12/1968 | Salerno.............................. 251/35 X |
| 3,833,200 | 9/1974 | McCombs........................... 251/35 |

FOREIGN PATENTS OR APPLICATIONS

| 640,088 | 12/1936 | Germany ............................ 251/35 |
| 26,896 | 1908 | United Kingdom.................. 251/35 |

Primary Examiner—Alan Cohan
Assistant Examiner—Gerald A. Michalsky
Attorney, Agent, or Firm—Daniel Rubin

[57] ABSTRACT

A quick-acting isolating valve including a valve body having a fixed seat defining an opening through which fluid may flow and co-acting therewith a movable head carried on a stem which is provided with a piston reciprocable in a piston chamber formed in the valve body, there being a fluid outlet from the chamber permitting discharge of fluid from the chamber upon movement of the piston within the chamber when the movable head moves toward or away from its fixed seat and means for effecting progressive restriction of fluid flow through the outlet as the movable head approaches the position of abutment with the fixed seat.

14 Claims, 5 Drawing Figures

QUICK ACTING VALVES

This invention relates to quick-acting isolating valves and more particularly to quick-acting isolating valves for shutting-off or diverting fluid flow from a component part of a fluid circulatory system, wherein the valve includes a valve body with a fixed seat defining an opening through which fluid may flow and a head moveable between a position remote from the seat so as to permit fluid flow through the valve and a position abutting the seat so as to prevent fluid flow through the valve.

Such valves may be of the type where the moveable head comprises a disc, plunger, needle or other obturating means which moves in a more or less axial direction when considered in relation to the fluid flow through the opening defined by the fixed seat (including angle valve variants of this type) or of the so called slide, gate, or sluice type where the head moves or less directly across the direction of fluid flow through the opening defined by the fixed seat.

It will be appreciated that since the invention relates to quick-acting isolating valves the foregoing terms relating to fluid flow and head positions are used in relation to the fully open and fully closed positions of the valve and movements between these positions; during the brief shutting-off or flow diverting time there may be situations where the head is in partial abutment with the seat and the temporarily throttled fluid flow will be non-axial.

One of the problems that can arise with quick-acting valves is that physical damage may be done to the valve when the head rapidly moves from one position to the other. With a valve having an axially moving head the seat may be damaged due to the impact and with a slide valve the head may shoot past the seat due to its momentum. The quick-acting valves of this invention have a built-in damping mechanism towards the end of the stroke as the head moves from one position to the other.

According to the present invention there is provided a quick-acting isolating valve including a valve body having a fixed seat in the body defining an opening through which fluid may flow and co-acting therewith a moveable head carried on a stem which is provided with a piston reciprocable in a chamber formed in the valve body, there being a fluid outlet from the chamber permitting discharge of fluid from the chamber upon movement of the piston within the chamber when the moveable head moves towards or away from its fixed seat and means for effecting progressive restriction of fluid flow through the outlet as the moveable head approaches the position of abutment with the fixed seat.

Preferably, the means for effecting progressive restriction of fluid flow from the piston chamber comprises one or more fixed orifices in the chamber which is or are progressively closed off from communication with the chamber or restricted in aperture by the movement of the piston and stem.

Having now described the invention in general terms, the following description illustrates particular embodiments of it.

For example, valves according to the invention may be made in the form of quick-acting valves for use in conjunction with a by-pass for an economiser or feed-water heater for boilers in power stations and these valves take the form either of a shut-off valve or of a flow diverting valve.

Such valves are described with reference to the accompanying drawings in which.

Figures 1, 1A:
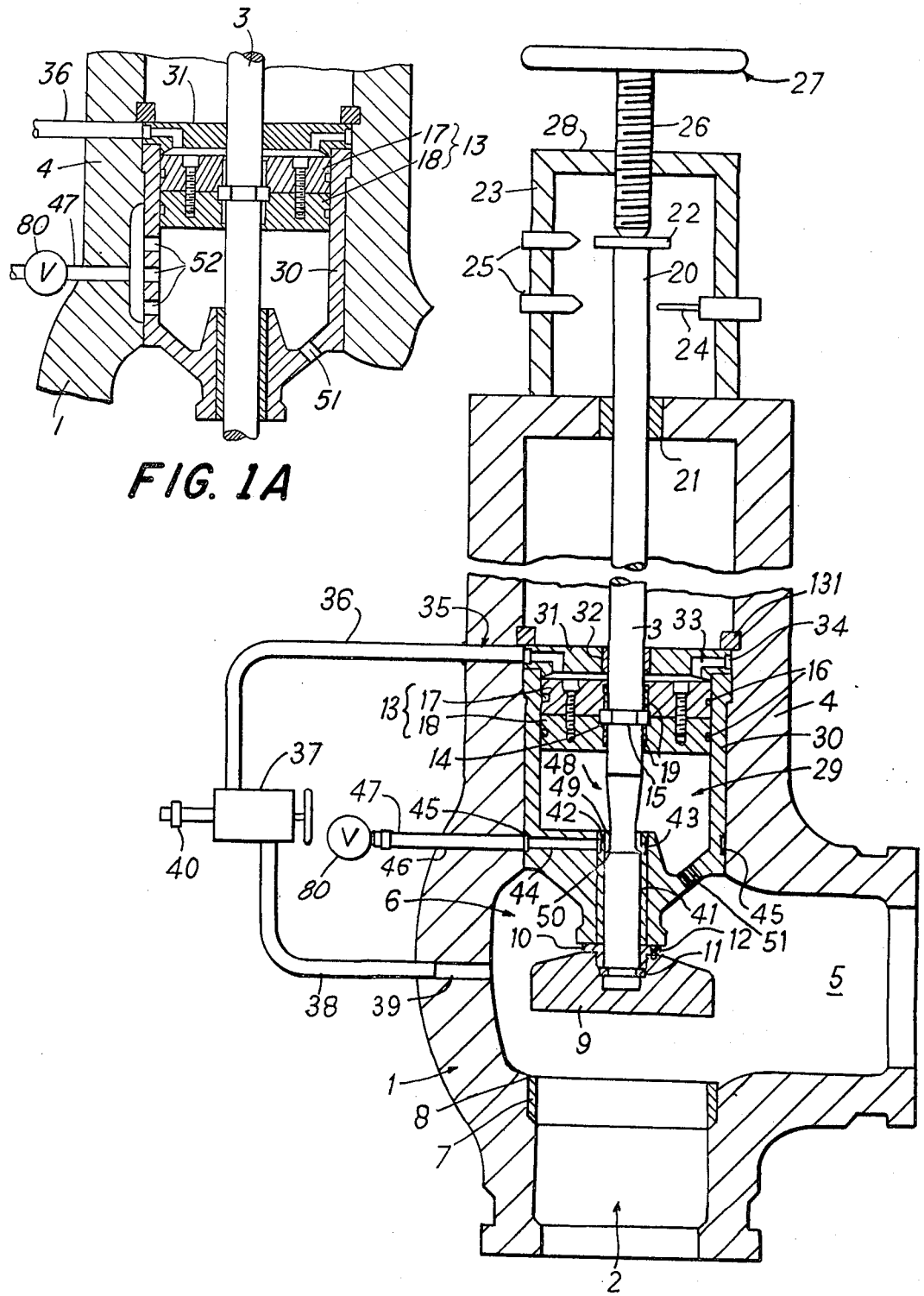
FIG. 1 shows a sectional view (partly diagrammatic) of a shut-off valve according to a first embodiment of the invention.
FIG. 1a shows a fragmentary sectional view of an alternative arrangement more suitable for smaller valves.

The shut-off form of the valve illustrated in FIG. 1 includes a body 1 having an inlet 2 extending co-axially of a valve stem 3 moveable in a stem portion 4 of the body and an outlet 5 extending perpendicularly thereto. A valve chamber portion of the body 6 is formed at the junction of the inlet and outlet and is provided with a machined insert 7 welded to the valve body forming a hard faced seating 8 around the inlet. A valve head 9 carried on the stem is arranged to co-act with the seating to close off the inlet from the valve chamber and outlet.

The valve head is, for ease of manufacture, assembly and servicing, detachably mounted on the stem by means of a nut and packer-washer arrangement, comprising a valve head nut 10 in screw threaded engagement with the head, a packer washer or split ring 11 fitting into a circumferential groove in the stem end portion, and a set screw 12 locking the heat nut to the head to prevent them rotating independently of each other which would allow the head to unscrew during use.

The stem also has mounted on it a piston 13 rigidly located thereon by means of a split-ring collar 14 positioned in a circumferential groove 15 in the stem.

The piston is of cylindrical shape and has piston rings 16 in grooves around its external cylindrical face. Conveniently, for large size valves, the piston 13 is made in two halves 17 and 18 in the form of discs which are bolted together to enclose the split-ring collar. Piston bushes 19 ensure accurate location of the piston on the stem.

The stem above the piston, that is to say the part of the stem remote from the valve head, may extend upwardly as an integral unit through a packing gland 21 in the valve body, or to allow a slight degree of play for a long stem, it may be rotatably connected, by a connection not shown, to a spindle 20 extending co-axially of the stem and passing through the said packing gland. In the illustrated embodiment a spindle is used. The stem or spindle carries a collar 22. Two rigid pillars 23 extending upwardly from the valve body carry a double acting limit switch 24 and pointers 25 which coact with the said collar to indicate the position of the collar at the limits of its axial movement and hence indicate the position of the valve head at any time. A screw threaded top stem 26 with hand wheel attachment 27 is bushed through a yoke 28 joining the two pillars 23, with the lower end of the top stem abutting the top of the spindle 20. Thus the valve may be manually operated. Means (not shown) are provided for locking the threaded top stem 26 to the extension of the piston stem 3 or extension spindle 20 so that the valve may be locked open.

The chamber 29 in which the piston moves is formed in the valve body by means of a liner 30 which is manufactured separately and then rigidly fixed inside the valve body.

The liner is closed at the top by a plate 31 having a bushed central hole 32 for the stem, which allows reciprocal movement of the stem through the plate. The chamber top plate is held in fluid tight abutment with the cylindrical liner by means of segment rings 131 cooperating with a circumferential grooved recess in the internal cylindrical wall of the valve body.

The chamber top plate 31 also has two or more passageways 33 connecting a circumferential groove 34 in the top plate cylindrical side wall to the interior of the chamber above the piston.

The top of the piston or the bottom of the chamber top plate or both are slightly concave to define a small dead space between the piston and chamber top plate when the piston is at the upper limit of travel, as shown.

A passageway 25 through the valve body stem portion connects the circumferential groove 34 to a pipe 36 which leads to a separate three-way valve 37. A second pipe 38 from the three-way valve 37 leads to a passageway 39 through the valve body to the valve chamber 6. The third pipe 40 from the three-way valve leads to a drain connection. Thus the portion of the piston chamber above the piston can be connected to the main valve chamber 6 or to a drain connection 40.

The liner 30 has a machined cylindrical internal surface to cooperate in fluid tight arrangement with the piston rings. At the lower end nearer the valve head, the liner is formed with a central axial cylindrical hole provided with a sleeve 41 having a cylindrical bore in which the stem slides in liquid tight manner. The top of the sleeve bore defines a circular fixed orifice or mouth connecting the sleeve bore to the piston chamber.

The upper end of the said sleeve 41 is penetrated by a radial passage-way 42 connecting through an external circumferential groove 43 in the sleeve with a further radial passage 44 in the liner which in turn connects with an external circumferential groove 45 in the liner. This circumferential groove 45 then connects with a radial passageway 46 through the valve body to a pipe 47 leading to a drain connection having a cock 80 which is readily vented to drain and electrically operated between open and closed positions.

The stem 3 of the valve is of cylindrical cross-section over the major part of its length and in particular over the portion above the piston which slides through the bushed hole 32 in the chamber top-plate and the lower part which moves within the portion of the sleeve 41 below the radial passage 42 leading from the sleeve. However, the portion of the stem which coacts with the mouth of the sleeve upon movement of the piston and which is shown adjacent the upper end of the sleeve in FIG. 1 is necked or waisted, having a frusto-conical upper portion 48 tapering to an intermediate cylindrical portion 49 which in turn, is radiused out at 50 to the full cylindrical cross section of the lower part of the stem.

Figure 2:
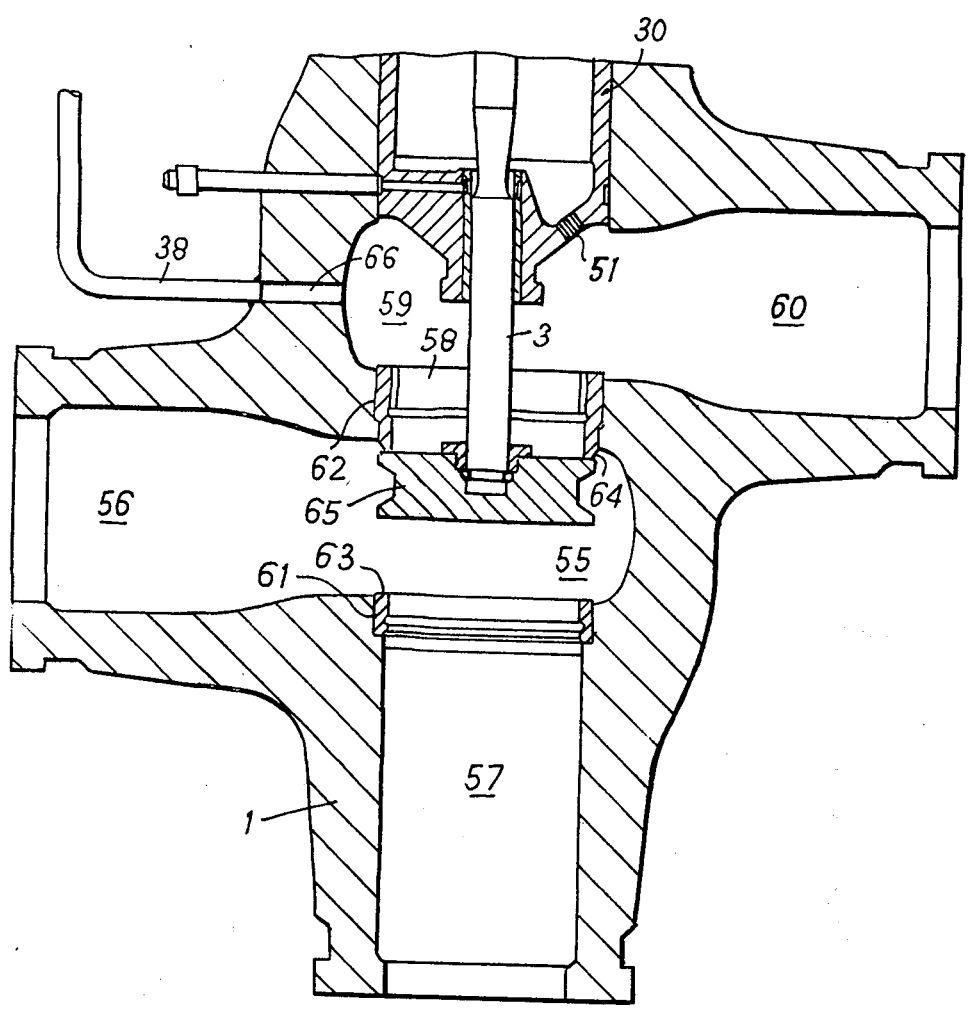
FIG. 2 shows the lower part only of a valve of similar type to that of FIG. 1 but in the form of a flow diverting valve.

The lower portion of the liner, which extends into the valve chamber is provided with small diameter orifices 51 connecting the lower half of the piston chamber 29 with the valve chamber 6. FIG. 2 shows the inlet and outlet portions only of a diverting valve wherein the upper portion of the valve which includes the piston chamber is the same as that of FIG. 1 and is not shown. The valve body 1 includes a main valve chamber 55 provided with an inlet 56 extending perpendicularly of a valve stem axis. Alternative main and by-pass outlets extend from the main valve chamber initially co-axially of the valve stem. The main outlet 57 extends co-axially of the valve stem away from the piston chamber (downwardly in the drawing) from the side of the valve chamber remote from the valve stem. The by-pass outlet takes the form initially of a throat portion 58 leading from the side of the valve chamber nearest to the piston chamber and passes around the valve stem, as its axis. This throat portion leads into a secondary valve chamber 59 also traversed by the valve stem which chamber in turn extends radially to a branch connection forming the by-pass outlet proper 60, perpendicular to the valve stem axis.

Machined hard faced inserts 61 and 62 are welded and screwed respectively into the valve body to provide seatings to the outlets from the main valve chamber 55. Insert 61 is similar to insert 7 of FIG. 1 and provides a fixed seat 63 defining an opening to the main outlet 57. Insert 62 defines the throat portion 58 leading from the main valve chamber to the secondary valve chamber and its lower edge carries a fixed seat 64 defining an opening to the throat and hence to the by-pass outlet.

A valve head 65 carried on the stem 3 (and mounted in the same way as the head 9 of FIG. 1) is faced and machined on both faces to co-act with either of the seatings 63 or 64 so as to close off either one of the outlets from the main valve chamber. As shown in FIG. 2 it closes off the by-pass outlet.

A passageway 66 leads from the secondary valve chamber 59 to a pipe 38 which in turn leads to a three way valve as per FIG. 1. The passageway 66 can be made to lead from the main valve chamber 55 instead of from the secondary valve chamber.

A liner 30 to define a piston chamber extends into the secondary valve chamber. The liner is joined with passageways, the valve stem is waisted and carries a piston, and the stem extends upwardly to a hand wheel as shown and described for FIG. 1.

Figure 3:
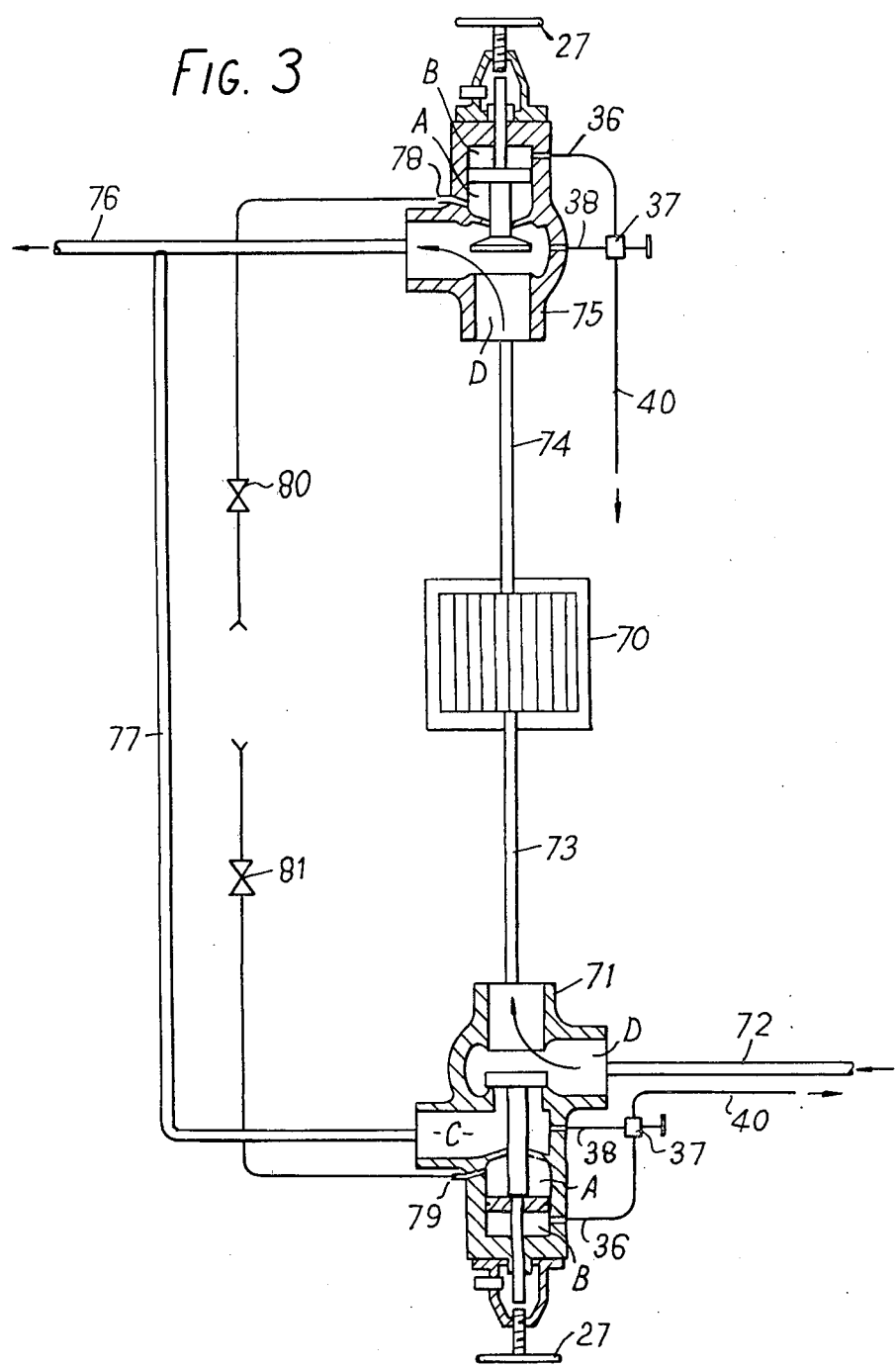
FIG. 3 shows in diagrammatic form a circulatory system including a feed water heater for a power station boiler and a by-pass circuit using a shut-off valve of the type shown in FIG. 1 and a flow diverting valve of the type shown in FIG. 2.

FIG. 3 shows diagrammatically a feed water heater 70 for a power station boiler which heater may be isolated by use of valves according to the present invention. FIG. 3 shows the heater in circuit, that is to say not isolated.

A flow diverting valve 71 has its inlet connected directly to the main feed line 72 and its main outlet leads via feed line 73 to the heater. Water leaves the heater via pipe 74 which is connected to the inlet of a shut-off valve 75. The outlet of the shut-off valve leads via pipe 76 to the boiler. A branch connection 77 leads directly from the by-pass outlet of flow diverting valve 71 to the boiler feed pipe 76. The form of the diverting valve 71 is as shown and described in FIG. 2 and the shut-off valve 75 is of the form shown and described in FIG. 1. For the sake of clarity, detail of the waisted portion of the valve stem and co-acting fixed orifice as the mouth of a sleeve in which the stem moves has been omitted in FIG. 3. However, passage 78 of shut-off valve 76 corresponds to passageways 42 to 47 of the shut-off valve which is more fully illustrated in FIG. 1 and extends from the portion of the piston chamber below the piston. Similarly, passage 79 of diverting valve 71 extends from the portion of the piston chamber below the piston. Passages 78 and 79 lead to cocks 80 and 81 which are readily vented to drain and are electrically operated.

The three-way valve 37 and pipes 36, 38 and 40 correspond to those shown in FIG. 1. For ease of reference on both of valves 71 and 75 in FIG. 3 the portion of the piston chamber above the piston, that is to say between the piston and the chamber lid or closure plate is denoted B, the portion of the chamber below the piston, that is to say nearer to the moveable valve head is denoted A, the secondary valve chamber is denoted C, and the main valve chamber is denoted D.

The system operates as follows.

Consider first of all the diverting valve 71. The pressure obataining in the main valve chamber D will be that of the feed lines 72 and 73.

After leaving this valve water flows through feed line 73 to the heater 70, through the pipe 74 to the shut off valve 75 and into feed pipe 76 — which is connected to by-pass 77 so that the pressure in pipe 76 is applied to the secondary valve chamber C of the diverting valve. However, frictional flow losses arising from flow through the foregoing components produce a pressure differential between the main valve chamber D and the secondary valve chamber C. For example, with water at 480°F flowing at 15 feet per second and at an initial pressure of 2850 p.s.i. through the above circuit there may be a pressure loss of about 60 p.s.i. This pressure differential subjecting the main valve chamber to a higher pressure than the secondary valve chamber will tend to keep the moveable head of the diverting valve firmly against the seating leading to the by-pass. With the three-way valve 37 connecting the secondary valve chamber C to portion B of the piston chamber, the pressure in the two chambers are equal. The small diameter orifices 51 (not shown on FIG. 3 but visible on FIGS. 1 & 2) extending from the secondary valve chamber to the base of the piston chamber ensure equalisation of pressure between portions A of the piston chamber and the secondary valve chamber C when cock 81 is shut sealing off passage 79. Thus the pressures obtaining in portions A and B of the piston chamber are equal and have no effect on the piston so that no force is transmitted down the stem. An unbalanced force acting on the valve head portion corresponding to the cross sectional area of the stem tends to act to keep the head against the by-pass outlet.

Considering shut-off valve 75 the situation will be similar to that in the diverting valve. Portions A and B of the piston chamber are at equal pressure and the force acting on the moveable head arising from the pressure obtaining in pipe line 74 acting on an area of the head corresponding to the cross-sectional area of the stem maintains the head in an open position.

When it is required to isolate the heater, cocks 80 and 81 are opened. This is normally done automatically. For example if a tube bursts in the heater 70 a detector senses the rise in water level in the heater shell and actuates a switch which immediately vents the taps 80 and 81 to drain.

Water is vented then from portions A of the piston chambers of both valves via passages 79 and 78, causing the pressure to drop rapidly. This is because the flow area of the passages 79 and 78 is appreciably greater than that of the small diameter orifices 51 connecting the chamber A of flow diverting valve 71 to the secondary valve chamber C of valve 71 and the small diameter orifices connecting chamber A of shut-off valve 75 to the main chamber of valve 75.

Portion B of the piston chamber of each valve remains at the original pressure by virtue of connection 36 and 38 through the three-way valve 37, the pipes 37 and 38 being of a cross-sectional area similar to that of pipes 78 and 79. The differential pressures acting on the faces of the pistons move the pistons and hence the moveable heads towards their respective seats. It is during the closure stroke that the damping effect of the invention comes into play. However, this will be described more particularly in relation to the individual valves after this general description relating to FIG. 3. Once the pistons have completed their strokes, valve 71 closes off the main outlet to the heater and diverts the flow via the by-pass line 77 and the shut-off valve 75 closes off the inlet from the heater. The heater is thus completely isolated.

As long as cocks 80 and 81 remain in the venting position and the three-way valves 37 connect the portions B of the piston chambers to flow lines 76 and 77, the heater remains isolated.

When it is required to reverse the operation, the cocks 80 and 81 are shut, allowing pressure to build up in portions A of the piston chambers. The three-way valves 37 are turned to connect the portions B of the piston chambers to drain with consequent movement of the pistons, the speed of which movement is controllable by manual restraint on hand wheel 27 on the valve. When the valves 71, 75 are in the fully open position the three-way valves are turned to connect portions B of the piston chambers to the main valve chamber D or secondary valve chamber C as appropriate. It will be appreciated that the shut-off valve 75 should be moved to the fully open position before re-diverting the flow through the heater, and that on recommissioning the heater it is advisable to prime pipes 73 and 74 before allowing high pressure flow through the pipes, and additional valved pipes may be provided for this purpose.

The above description of operation does not illustrate the damping effect of the valves and this will now be described with reference in the main to FIG. 1. Upon connecting the pipe 47 to drain, water from the chamber 29 flows through the passageway via the mouth of the sleeve between the sleeve and the reduced section portion 49 of the stem, then the radial passageway 42 through the sleeve, the circumferential groove 43 in the sleeve, the radial passage 44 through the cylinder liner, the circumferential passage 45 in the liner, and then the radial passage 46 through the body and finally the pipe 47, each of which have a cross-sectional flow area which is large compared with the cross-sectional flow area of the small orifices 51. Fluid also passes from the valve chamber 6 to the portion B of the piston chamber above the piston via the relatively large diameter passageways 39, 38, valve 37 and passageways 36, 35, 34 and 33 in that order. The piston will therefore start to move towards the valve seat. Whilst the cylindrical necked portion 49 of the stem is moving through the mouth of the sleeve the size of the aperture for fluid to leave the piston chamber remains constant. The piston therefore gains momentum as the movement of the piston assists the removal of fluid from the bottom of portion A of the chamber. However, once the frusto conical portion 48 of the stem starts to co-act with the fixed orifice defined by the mouth of the sleeve, the annulus between the stem portion 48 and the fixed orifice starts to decrease in area. The further the portion 48 penetrates into the sleeve the less the area of the annular opening becomes, thereby progressively restricting the egress of fluid from the portion A of the valve chamber by the obturating effect of the stem in the sleeve. The progressive restriction serves hydraulically to limit the volume of fluid forced out of the piston chamber at any given moment which in turn retards the movement of the piston and cushions the impact of the valve head on the seating.

Figure 4:
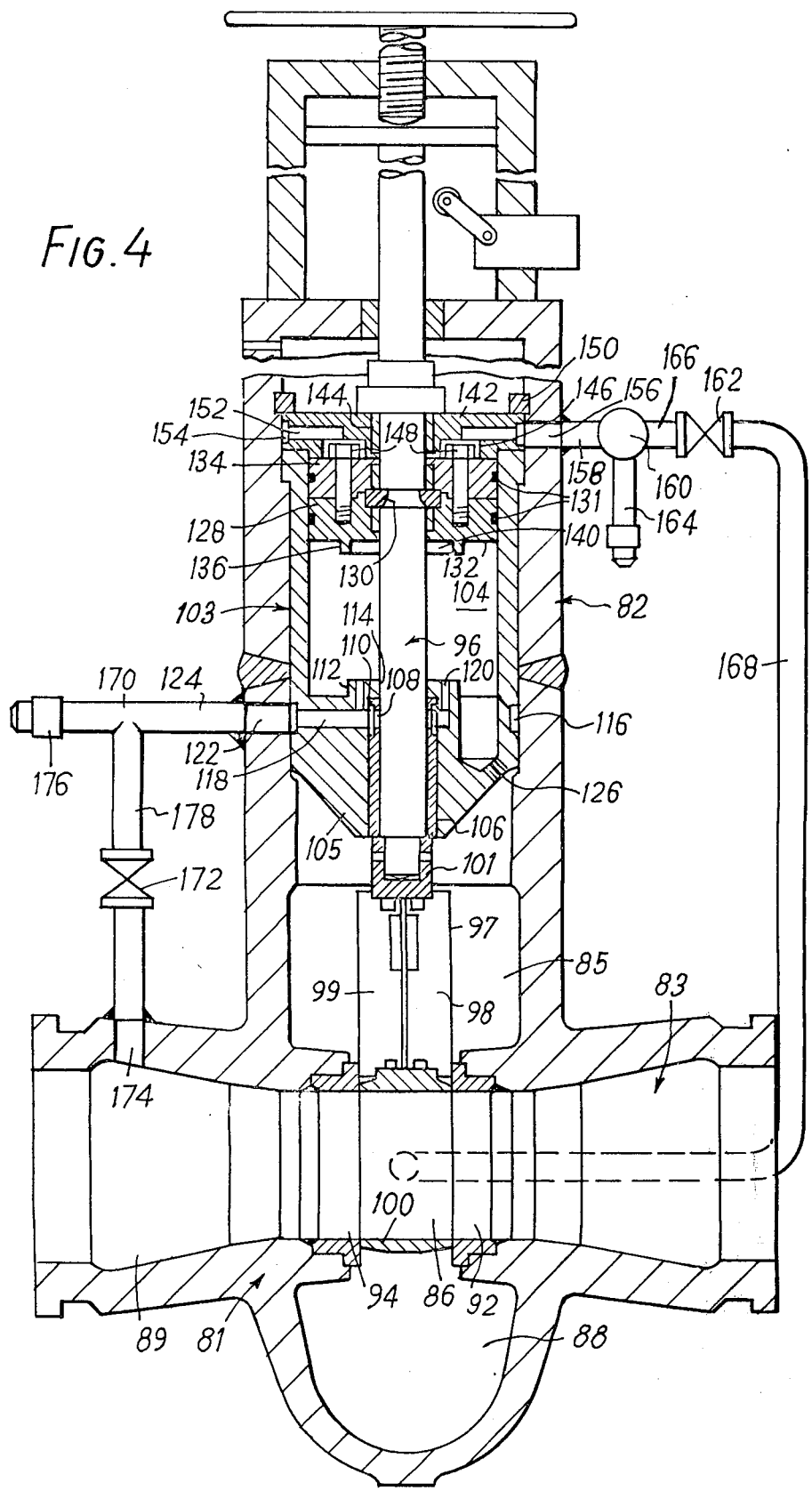
FIG. 4 shows a sectional view (partly diagrammatic) of a shut-off valve according to a second embodiment of the invention.

FIG. 4 represents an alternative design of valve embodying the invention.

Whereas FIGS. 1 and 2 show globe valves (so called because the valve chambers are enclosed within a globe-like portion of the body) using as the moveable head a disc which moves axially with respect to the outlet from the valve chamber, FIG. 4 is of the parallel slide valve type where the moveable head moves perpendicularly across the fluid flow.

The valve body has a chamber portion 81 and a stem portion 82. The chamber portion 82 has an inlet 83 and a co-axial outlet 89 both leading to a valve chamber which is itself divided into three parts namely an upper valve chamber 85, a throat portion 86 and a lower valve chamber 88. As is common with slide valves, the inlet 83 and outlet 89 are tapered towards the throat portion 86 to give a nozzled effect to the bores. The lower valve chamber 88 takes the form of a bowl beneath the throat portion. The upper valve chamber 85 is in the form of a cylindrical space in the stem portion of the body.

Inserts 92 and 94 are welded into the mouths of inlet and outlet where they join the valve chamber and these provide circular fixed seats at each end of the throat portion of the valve chamber.

A stem 96 is mounted through the body so that it may reciprocate along the axis of the stem portion 82 of the valve body.

Mounted on the bottom of the stem 96 are a double faced slide disc 97 and an eye-piece 100. The slide disc 97 is mounted onto the stem 96 via an attachment piece 101 which itself is screwed onto the lower end of the stem and locked against rotation by a pin or bolt. The slide disc is conveniently manufactured in two halves, one of which 98 will mate with the fixed seat on the inlet insert 92 and the other of which 99 will mate with the fixed seat on the outlet insert 94 when the valve is shut by lowering the slide disc into the throat portion 86 of the valve chamber. The two halves 98 and 99 of the slide disc are spaced apart so that they will abut in fluid tight manner with the fixed seats. (In some embodiments the two halves may be spring loaded to be urged apart). The eye-piece 100 mounted below the slide disc 97 takes the form of a ring with a cylindrical bore and which when the valve is open (as illustrated) crosses the throat portion 86 of the valve chamber between the fixed seats and joins up the inlet and outlet bores creating a continuous bore from inlet to outlet. However, the eye-piece 100 does not form an absolutely fluid tight seal against the seats of inserts 92 and 94 and so, when the valve is in use the lower chamber 88, the throat portion 86 and the upper chamber 85 will contain fluid at approximately the pressure obtaining in the eye-piece, a slight pressure loss being expected because the fluid has to seep around the edges of the eye-piece 100.

When the valve is shut, the eye-piece descends into the lower valve chamber 88 and as previously stated the slide disc then obturates the throat portion 86 of the valve chamber.

A cylindrical liner 103 is rigidly fixed into the stem portion 82 of the body with its lower end wall 105 projecting into the upper valve chamber 85. The interior of the liner is in the form of a piston chamber 104 with a machined cylindrical internal surface.

The axial centre of the lower end wall 105 of the liner is provided with a sleeve 106 in which the piston stem 96 reciprocally moves in fluid-tight relationship. The sleeve 106 is provided at its upper end with a radial passage 108 and an external circumferential groove 110.

Immediately adjacent the upper end of the sleeve and co-axial therewith is an upstanding cylindrical portion 112 of the lower end wall of the liner which projects into the piston chamber 104. The stem 96 is a loose sliding fit down the central axial bore 114 of the upstanding cylindrical portion 112.

The liner 103 is provided with an external circumferential passageway 116 and a radial passageway 118 which connects with the passageways 108 and 110 in the sleeve 106. Two vertical passageways 120 through the upstanding cylindrical portion 112 parallel to the axial bore 114 put the radial passageway 118 into communication with the piston chamber 104.

A further passageway 122 extends radially through the stem portion of the body to connect an external pipe 124 to the circumferential passage 116 of the liner.

A series of small diameter holes 126 connect the bottom of piston chamber 104 to the upper valve chamber 85. The total cross sectional area of the holes 126 is less than the cross sectional area of the passageways 120.

The stem 96 also has mounted on it a piston 128 located thereon by means of a split-ring collar 130 positioned in a circumferential groove in the stem. The piston is of generally cylindrical shape and has piston rings 131 in grooves around its external cylindrical face. The piston reciprocates within the piston chamber 104 in fluid tight relationship.

The piston 128 is made in two halves 132 and 134 in the form of discs which are bolted together to enclose the split-ring collar 130.

The lower half 132 of the piston is provided at its base with a short cylindrical wall 136 co-axial with the piston and piston stem. The said short cylindrical wall defines a cylindrical recess 140 within its confines and the diameter of this recess is just fractionally greater than the outside diameter of the previously described co-axial upstanding cylindrical portion 112 on the end wall of the piston chamber. When the piston moves down the piston chamber, towards the end of its stroke the upstanding cylindrical portion 112 slideably coacts with the cylindrical recess 140 on the piston.

The liner 103 is closed at the top by a plate 142 having a bushed central hole 144 for the stem, which allows reciprocal movement of the stem through the plate. The plate is held in fluid tight abutment with the top of the liner by means of segment rings 150 co-operating with a circumferential grooved recess in the internal cylindrical wall of the stem portion of the valve body. The part of the valve above of the top plate 142 is the same as that described in relation to FIG. 1. The lower face of the plate 142 is provided with a large cylindrical groove 146 of a width and depth sufficient to accommoddate the bolt heads 148 of the bolts holding the two piston halves together. This groove 146 also serves as part of the piston chamber being a part which is not swept by the piston.

The chamber top plate 142 has two or more passageways 152 connecting a circumferential groove 154 in the cylindrical side wall of the top plate to the interior of the piston chamber above the piston.

A radial passageway 156 through the stem portion of the valve body at the same height as the piston chamber top plate connects the circumferential groove 154 to an external pipe 158. The pipe 158 leads to a three-way valve 160 and to a pre-set adjustable throttle valve 162. Both of these valves are conventional and are shown diagrammatically. The three-way valve is similar to the one described for FIG. 1 and has one pipe 158 (already described) leading to the portion of the piston chamber above the piston, one pipe 164 leading to a drain connection, and the third pipe 166 leading via the throttle valve 162 to a pipe 168 leading to the valve chamber. The throttle valve 162 is a conventional adjustable flow regulating valve which is locked or pre-set under field conditions as later described. Valves 160 and 162 are shown diagrammatically as separate valves but they can be a single composite valve or their positions can be interchanged putting the throttle valve between the three way valve 160 and the passageway 156.

Passage 122 from the bottom portion of the piston chamber leads to pipe 124 which passes via a T-piece connection 170 to a valved drain connection 176.

The lower arm 178 of the T-piece connection 170 leads via a throttle valve 172 to the passageway 174 through the valve body into the outlet 89.

Having now described the structure of the valve illustrated in FIG. 4 its method of working will be described.

The overall method of actuating the valve is essentially the same as that described for the shut-off valve 75 in FIG. 3 and will not be repeated here. However, certain differences exist.

For ease of reference the portion of the piston chamber 104 above the piston, that is to say between the piston top half 134 and the top closure plate 142, will be referred to as sub-chamber B and the portion of the piston chamber below the piston, that is to say between the piston lower half 132 and the linear end wall 105, will be referred to as sub-chamber A: these reference letters correspond to those used in FIG. 3.

In the open position as shown in connection to drain from sub-chamber A via pipe 124 is closed. The pressure in chamber A is approximately that of valve chamber portions 85, 86 and 88 because of the small diameter holes 126 and the feed back along pipe 178 from the outlet 89. The three-way valve 160 is set to connect sub-chamber B to the valve chamber. Thus the pressure in sub-chamber A is the same as the pressure in sub-chamber B and is also that obtaining in the valve chamber.

When it is required to shut the valve the valve-cock on pipe 176 is vented to drain. The pressure in sub-chamber A will thus drop whereas the pressure in sub-chamber B will remain high. Hence the piston will start to move down.

It will be appreciated that the two regulating or throttle valves 172 and 162 must be pre-set in such a way that the rate at which fluid can enter sub-chamber B is greater than the rate at which fluid can leave sub-chamber A. The settings of valves 172 and 162 can be determined under field conditions and allow a certain degree of control over the speed of operation of the valve. Whereas all the cross-sectional areas of passageways inside the valve are built-in unalterable characteristics of the valve, the settings of valves 172 and 162 can slightly amend these valves to suit local field conditions of flow rates and pressures. Throttle valve 162 slows up the flow of fluid into sub-chamber B whereas throttle valve 172 partially maintains the pressure in sub-chamber A by a feed-back of pressure and hence tends to slow up the egress of fluid from sub-chamber A.

In alternative arrangements (not shown) the pipes 178 and 168 connecting the throttle valves 172 and 162 to the outlet and valve chamber respectively may be connected to different positions. For example the passageway 174 leading to pipe 178 and throttle valve 172 may lead to the inlet 83 in order to partially maintain the pressure in sub-chamber A from the upstream side of the main valve: obviously in such a re-arrangement the throttle valve setting would be different from that used in the illustrated downstream position, but the principle of operation would be the same.

When the pressure in sub-chamber B is higher than that obtaining in sub-chamber A and fluid can leave sub-chamber A at a greater rate than fluid can enter sub-chamber B, the piston 128 moves down the piston chamber. Hence the eye-piece 100 descends into lower valve chamber 88 and slide disc 97 moves into the throat portion 86 of the valve chamber, since these components are rigidly mounted on the same stem 96 as the piston.

While the piston is moving down the piston chamber, fluid is leaving sub-chamber A by the pasageways 120 at the top of the upstanding cylindrical portion 112 and these passageways communicate directly with the sub-chamber A. However, towards the end of the closure stroke the cylindrical wall 136 on the lower half 132 of the piston starts to come level with the top of the upstanding cylindrical portion 112 on the liner end wall 105. The passageways 120 in the upstanding cylindrical portion 112 cease to communicate directly with sub-chamber A but instead they communicate directly with the cylindrical recess 140 within the cylindrical wall 136 on the piston, and this recess communicates with the rest of sub-chamber A only via the annular clearance between the inner circular free edge of the wall portion 136 and the circular edge of the upstanding portion 112. As the piston and wall portion 136 descends still further, the upstanding cylindrical portion 112 enters into the recess 140 thereby closing it off so that the only communication between sub-chamber A and the recess 140 is via the cylindrical clearance between the co-acting cylinders 136 and 112. Therefore, the only communication from passageways 120 to the sub-chamber A is via this cylindrical clearance or flow path. The cylindrical components are manufactured to fine radial tolerances so the cylindrical flow path between the slideably co-acting cylinders is in fact practically zero. Thus the aperture of the orifices 120 communicating with sub-chamber A is severely restricted as the piston reaches the end of its stroke which causes the egress of fluid from sub-chamber A to be severely curtailed. This acts as a brake or hydraulic damping effect on the movement of the piston. Thus, the movement of the slide disc 97 as it reaches the position of abutment with the fixed seats on 92 and 94 is slowed.

The foregoing description with reference to FIGS. 1 to 4 illustrates typical embodiments of the invention which are suitable for the large valves needed in power stations.

It will be appreciated that alternative arrangements may be utilised. Thus whilst FIG. 1 relates to the provision of a single stem co-axial with the piston, it is also possible to have several stems placed for example, symmetrically on the piston each in turn moving in corresponding sleeves.

In another alternative arrangement of FIG. 12 and which is more suitable for smaller valves, a drilling 52 or series of drillings penetrate the side wall of the chamber which drilling or drillings are progressively obturated by the movement of the piston within the chamber.

In the case where there is a series of drillings, the individual drillings are preferably spaced at different axial positions in relation to the piston stroke and also angularly displaced relative to each other, as for example on a helical path up the cylindriical side wall.

In certain circumstances the inlet and outlet portions of the valves may be interchanged and slight modifications to the positions of attachment of the subsidiary pipe lines may be effected.

It is also possible to design the valves to that progessive restriction of the fluid outflow from the piston chamber occurs on the valve opening stroke instead of or as well as the closure stroke particularly in the case of a diverting valve.

I claim:

1. A quick acting isolating valve comprising in combination a valve body having a fixed seat defining an opening through which connected system fluid may flow in a path between an inlet and an outlet, a moveable head adapted to cooperate with said seat to open and close said opening to fluid flow, said head being carried on a stem which is provided with a piston reciprocable in a piston chamber formed in the valve body substantially isolated from the fluid flow path, means operatively effective for applying system pressure to both sides of said piston, auxiliary valve means selectively operable between a first position for retaining system fluid pressure at the underside of said piston and a second position relieving system fluid pressure from the underside of said piston to enable movement of said head toward said seat, a fluid outlet from the chamber communicating the underside of said piston with said auxiliary valve means and effective when said auxiliary valve means is in said second position to permit discharge of system fluid from the chamber upon movement of the piston within the chamber as the moveable head moves toward said seat and means for effecting progressive restriction of fluid flow through the outlet to cushion movement of said head as the moveable head approaches the position of abutment with said seat.

2. A valve according to claim 1 wherein the means for effecting progressive restriction of fluid flow from the piston chamber comprises at least one fixed orifice in the chamber progressively restricted in aperture by the movement of the piston and stem.

3. A valve according to claim 2 wherein one or more fixed orifices are provided in an end wall of the chamber, and the piston stem provides the means for restricting in aperture each of said orifices.

4. A valve according to claim 3 wherein a fixed orifice is formed in the end wall of the chamber as the mouth of a sleeve in which the stem of the piston reciprocally moves and the stem is of variable cross section over the portion which co-acts with the mouth of the sleeve so that the cross-sectional area of the aperture between the stem and the mouth of the sleeve varies as the stem moves in the sleeve.

5. A valve according to claim 4 wherein the portion of the stem of variable cross-section has a reduced cross section at the end which coacts with the mouth of the sleeve when the moveable head is at the limit of travel remote from the fixed seat, and a section of progressively increasing cross section towards the end which coacts with the mouth of the sleeve when the moveable head is in abutment with the fixed seat.

6. A valve according to claim 5 wherein the said portion of variable cross section is in the form of an axially symmetrical waisted portion which smoothly increases from a minimum cross section to the full cross section of the stem, and the mouth of the sleeve is of the same cross sectional area as the portion of the stem of full cross section.

7. A valve according to claim 6 wherein the minimum cross sectional area of the waisted portion lies at or close to one end of the same waisted portion.

8. A valve according to claim 2 wherein the said at least one fixed orifice comprises a plurality of orifices in the form of a series of drillings in the side wall of the chamber which are progressively obturated by the movement of the piston.

9. A valve according to claim 2 wherein the at least one fixed orifice is located in a fixed cylinder which slideably co-acts with a second co-axial cylinder on the piston end face, said co-action occurring towards the end of the stroke of the piston as the piston moves from a position corresponding to the moveable head being remote from the valve seat to a position corresponding to the moveable head abutting the fixed seat.

10. A valve according to claim 9 wherein the at least one fixed orifice is located in the end wall, of a fixed upstanding cylindrical portion on the chamber and the second co-axial cylinder on the end face of the piston comprises a cylindrical recess into which the upstanding cylindrical portion in the chamber end wall sides.

11. A valve according to claim 10 wherein the co-acting cylinder on the piston comprises a cylindrical recess defined by a short cylindrical wall on the end face of the piston.

12. A valve according to claim 9, wherein the co-acting cylinders are co-axial with the piston and piston stem.

13. A valve according to claim 1 wherein the means for effecting progressive restriction of fluid flow from the piston chamber through the outlet includes a restricted connection between the said outlet and the inlet or outlet flow path of said valve body.

14. A valve according to claim 1 wherein a second fixed seat is provided, the moveable head being moveable between positions co-acting with the respective first and second seats.

* * * * *